United States Patent
Jaradi et al.

(10) Patent No.: US 10,889,258 B2
(45) Date of Patent: Jan. 12, 2021

(54) AIRBAG HAVING CAVITY OPEN TOWARD FRONT CONSOLE

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Zhenyan Gao, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 16/394,882

(22) Filed: Apr. 25, 2019

(65) Prior Publication Data
US 2020/0339058 A1   Oct. 29, 2020

(51) Int. Cl.
*B60R 21/231* (2011.01)
*B60R 21/205* (2011.01)

(52) U.S. Cl.
CPC .......... *B60R 21/231* (2013.01); *B60R 21/205* (2013.01)

(58) Field of Classification Search
CPC ............................ B60R 21/231; B60R 21/205
See application file for complete search history.

(56) References Cited

U.S. PATENT DOCUMENTS

| | | | |
|---|---|---|---|
| 5,513,877 A | 5/1996 | MacBrien et al. | |
| 6,786,505 B2 | 9/2004 | Yoshida | |
| 8,215,665 B2 | 7/2012 | Ohara et al. | |
| 8,622,417 B1 | 1/2014 | Schneider et al. | |
| 8,876,156 B2 | 11/2014 | Turnbull et al. | |
| 9,296,358 B2 | 3/2016 | Chen et al. | |
| 9,308,883 B1 | 4/2016 | Schneider | |
| 9,446,733 B2 * | 9/2016 | Pausch | B60R 21/207 |
| 10,035,484 B2 | 7/2018 | Jaradi et al. | |
| 10,525,927 B2 * | 1/2020 | Fischer | B60R 21/231 |
| 2008/0143086 A1 * | 6/2008 | Higuchi | B60R 21/2346 280/736 |
| 2012/0193896 A1 * | 8/2012 | Turnbull | B60R 21/231 280/729 |
| 2017/0072892 A1 * | 3/2017 | Wang | B60R 21/205 |
| 2018/0229681 A1 | 8/2018 | Jaradi et al. | |
| 2018/0345895 A1 | 12/2018 | Farooq et al. | |
| 2019/0375364 A1 * | 12/2019 | Tanaka | B60R 21/2338 |

FOREIGN PATENT DOCUMENTS

WO   2007060515 A1   5/2008

* cited by examiner

*Primary Examiner* — Drew J Brown
(74) *Attorney, Agent, or Firm* — Frank A. MacKenzie; Bejin Bieneman PLC (57) ABSTRACT

A vehicle includes a front console and an airbag supported by the front console. The airbag is inflatable to an inflated position. The airbag in the inflated position has an inboard side and an outboard side spaced from each other in a cross-vehicle direction. The airbag in the inflated position has a cavity open toward the front console and extending through the inboard side and the outboard side.

16 Claims, 9 Drawing Sheets

FIG. 6 ured from each other in a cross-vehicle direction. The airbag 14 in the inflated position has a cavity 20 open toward the front console 12 and extending through the inboard side 16 and the outboard side 18.

AIRBAG HAVING CAVITY OPEN TOWARD FRONT CONSOLE

BACKGROUND

During a vehicle impact, occupants may move in a direction influenced by the momentum of the vehicle. In a frontal vehicle impact, an occupant may contact a vehicle component, e.g., an instrument panel, in front of the occupant. During the impact, the vehicle decelerates before the occupant decelerates. When the vehicle has decelerated but the occupant still has forward momentum, the occupant leans forward and may slide forward. This motion may bring the head or knees of the occupant in contact with the vehicle component in front of the occupant.

DETAILED DESCRIPTION

A vehicle includes a front console and an airbag supported by the front console. The airbag is inflatable to an inflated position. The airbag in the inflated position has an inboard side and an outboard side spaced from each other in a cross-vehicle direction. The airbag in the inflated position has a cavity open toward the front console and extending through the inboard side and the outboard side.

The cavity extends upwardly away from the front console. An upper lip and a lower lip each abut the front console. The cavity extends between the upper lip and the lower lip. The upper lip is elongated upwardly along the front console.

The airbag in the inflated position has an upper lip and a lower lip each abutting the front console. The cavity extends between the upper lip and the lower lip. An external tether may extend from the upper lip to the lower lip. The airbag may be generally U-shaped from the upper lip to the lower lip. The airbag includes a lower segment and an extension extending upwardly from the lower segment. The lower segment is between the cavity and the extension and includes the upper lip and the lower lip. The airbag includes a forward panel and a rearward panel defining an inflation chamber therebetween and extending generally in parallel from the upper lip to the lower lip. The forward panel extends along the cavity. The airbag includes an extension extending upwardly from the rearward panel.

The airbag in the inflated position includes a lower segment and an extension extending upwardly from the lower segment. The lower segment is between the cavity and the extension. The extension may be elongated away from the lower segment. The extension may abut the windshield. The lower segment is generally U-shaped. An uninflatable panel extends from the extension to the lower segment. Another uninflatable panel extends from the extension to the lower segment. The uninflatable panels are spaced from each other in a cross-vehicle direction. The lower segment and the extension share a common inflation chamber The airbag may be generally U-shaped around the cavity.

With reference to the Figures, wherein like numerals indicate like parts throughout the several views, a vehicle 10 includes a front console 12 and an airbag 14 supported by the front console 12. The airbag 14 is inflatable to an inflated position, and the airbag 14 in the inflated position has an inboard side 16 and an outboard side 18 spaced from each other in a cross-vehicle direction. The airbag 14 in the inflated position has a cavity 20 open toward the front console 12 and extending through the inboard side 16 and the outboard side 18.

Since the cavity 20 opens toward the front console 12, the airbag 14 in the inflated position deforms against the console when impacted by a vehicle 10 occupant. In particular, the cavity 20 allows the airbag 14 to deform when impacted by the knees and/or head of the occupant to control the absorption of energy by the airbag 14.

With reference to FIGS. 3A-D, the cavity 20 may extend upwardly from the front console 12. Accordingly, when the occupant impacts the airbag 14, the cavity 20 collapses. Specifically, the airbag 14 may include an upper lip 22 and a lower lip 24 each abutting the front console 12 with the cavity 20 extending upwardly between the upper lip 22 and the lower lip 24. Since the cavity 20 extends upwardly, the upper lip 22 and the lower lip 24 compress toward each other to collapse the cavity 20 when the airbag 14 is impacted by the occupant. For example, the lower lip 24 may be impacted by the knees of the occupant, which forces the lower lip 24 upwardly toward the upwardly extending cavity 20 and the upper lip 22. This upward movement of the lower lip 24 also positions relative to the head of the occupant.

The airbag 14 may include one or more tethers 26 extending from the lower lip 24 to the upper lip 22. The tether 26 controls movement of the lower lip 24 relative to the upper lip 22 during collapse of the cavity 20. Specifically, the tether 26 limits movement of the lower lip 24 in a cross-vehicle direction and limits movement of the lower lip 24 away from the upper lip 22 when the lower lip 24 is impacted by the occupant, e.g., by the knees of the occupant.

The airbag 14 may include an extension 28 extending upwardly, e.g., from the upper lip 22. The extension 28 is positioned to contact a windshield 30 of the vehicle 10 to control movement of the airbag 14 when impacted by the occupant. Specifically, the extension 28, when abutting the windshield 30, acts as a reaction surface to resist movement of the upper lip 22 toward the windshield 30 to position the airbag 14 to be impacted by the occupant, e.g., the head of the occupant.

Figure 1:
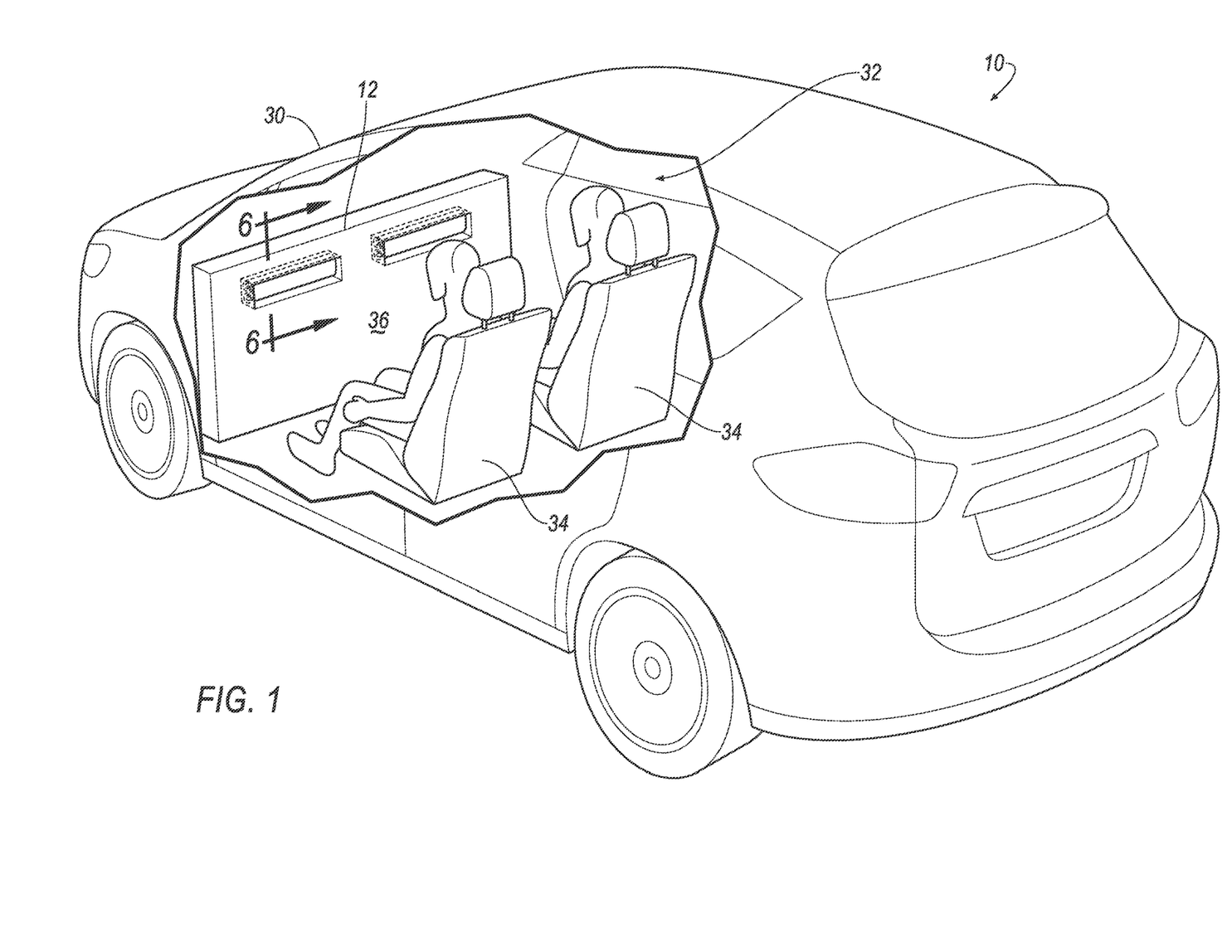
FIG. 1 is a perspective view of a vehicle including airbags supported by a front console with the airbags in an uninflated position.
Figure 2:
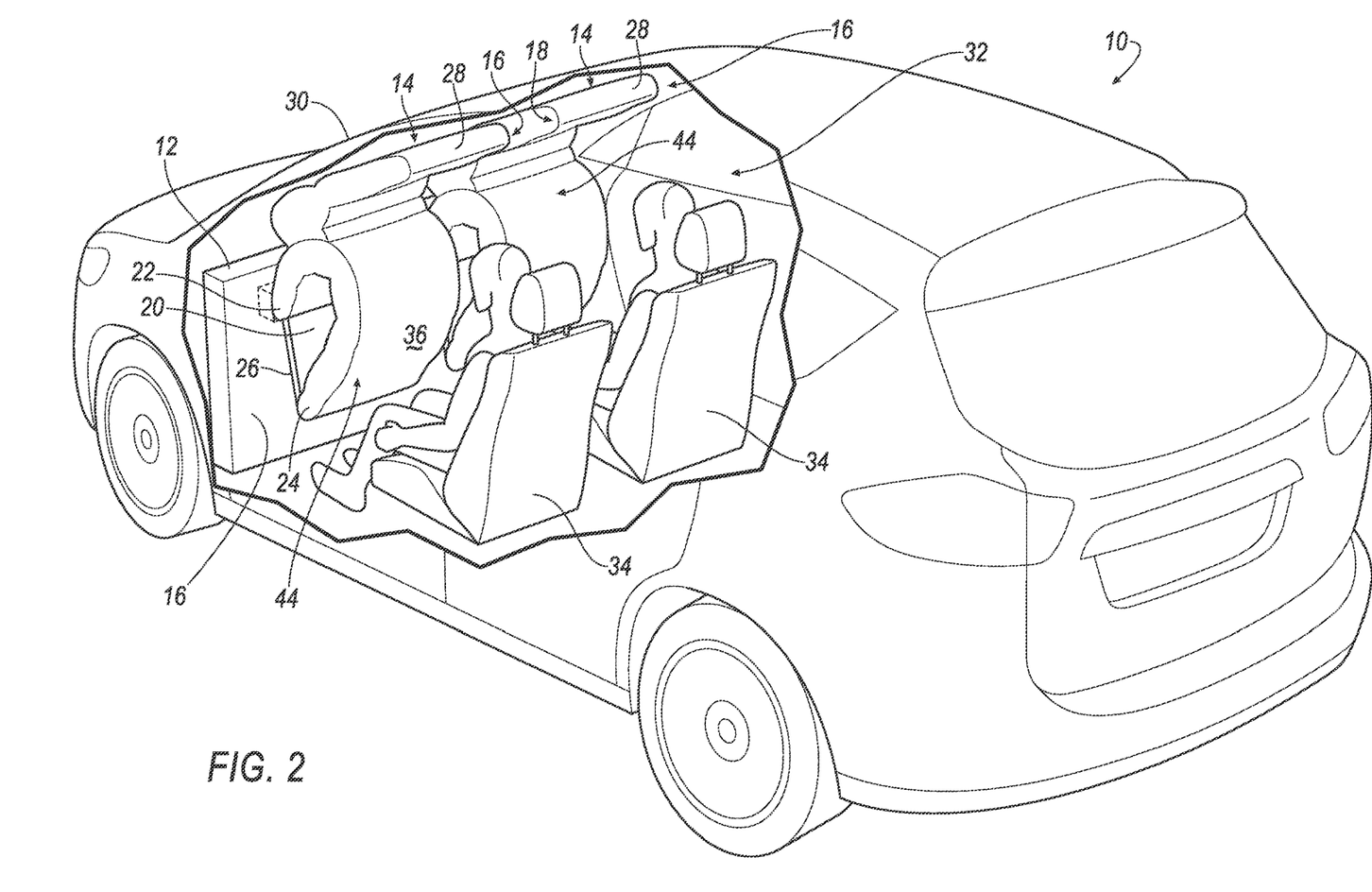
FIG. 2 is a perspective view of the vehicle including airbags supported by the front console with the airbags in an inflated position.

With reference to FIGS. 1 and 2, the vehicle 10 may, for example, be any suitable type of automobile. The vehicle 10 may, for example, be an autonomous vehicle. In this situation, the vehicle 10 may allow for the elimination of a steering wheel. For example, the vehicle 10 shown in the Figures does not include the steering wheel. The vehicle 10 may have a computer (not shown) that may control the operations of the vehicle 10 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of propulsion, braking, and steering of the vehicle 10; in a non-autonomous mode, a human operator controls the vehicle 10 propulsion, braking, and steering.

The vehicle 10 includes a passenger cabin 32 to house occupants, if any, of the vehicle 10. The passenger cabin 32 may extend across the vehicle 10, i.e., from one side to the other side of the vehicle 10.

The windshield 30 extends from one side of the vehicle 10 to the other side of the vehicle 10. In other words, the windshield 30 may extend from one front pillar to another front pillar. The windshield 30 may extend from a roof of the vehicle 10 downwardly along the front pillars to the front console 12.

The vehicle 10 includes one or more seats 34 in the passenger cabin 32. For example, at least one seat 34 is arranged at a front of the passenger cabin 32 adjacent the front console 12, i.e., with the lack of anything between the seat 34 and the front console 12. In other words, a seat bottom of the seat 34 may extend from a seatback of the seat 34 toward the front console 12. The seat 34 may include a seatbelt assembly used to restrain the occupant relative to the seat 34, e.g., in the event of a vehicle impact. As another example, the seat 34 may not include a seatbelt, i.e., is seatbelt-less. In such an example, the occupant is unrestrained relative to the seat 34 during normal operation of the vehicle 10 and passive restraints, e.g., the airbag 14, controls the kinematics of the occupant during a vehicle impact.

Figure 3A:
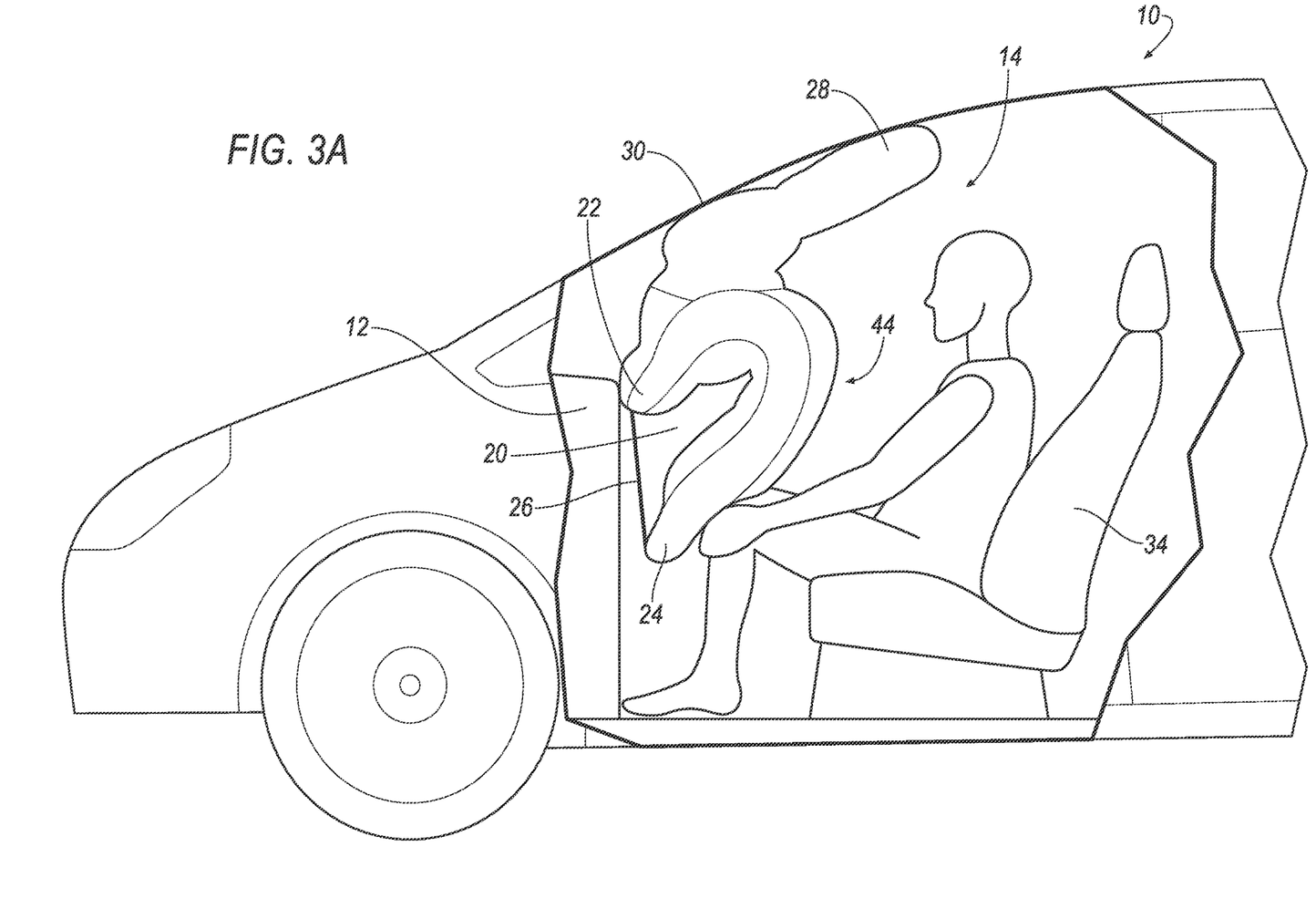
FIG. 3A is a side view of the vehicle including airbags supported by the front console with the airbags in an inflated position during a vehicle impact.
Figure 3B:
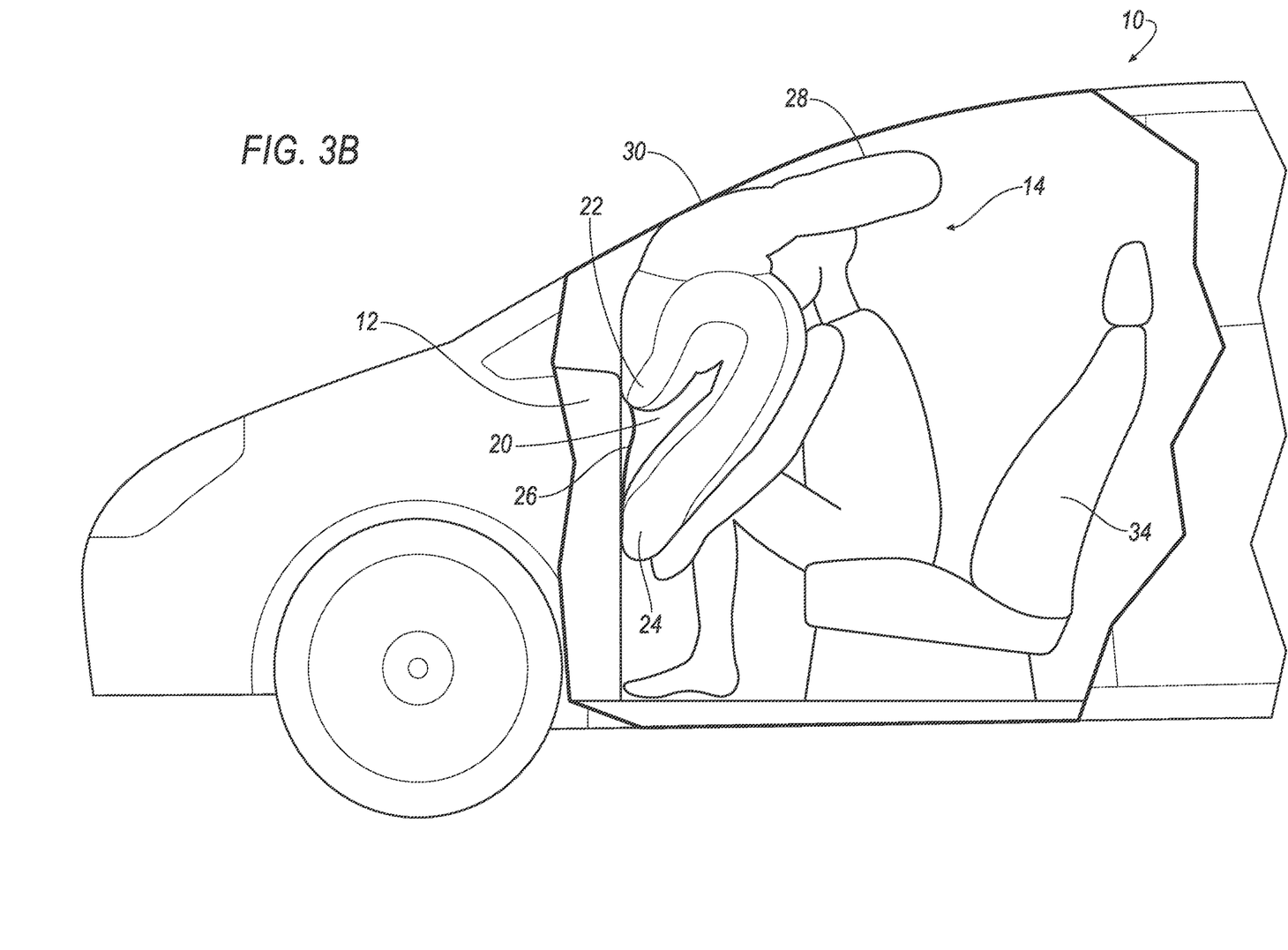
FIG. 3B is the side view at a later time than FIG. 3A.
Figure 3C:
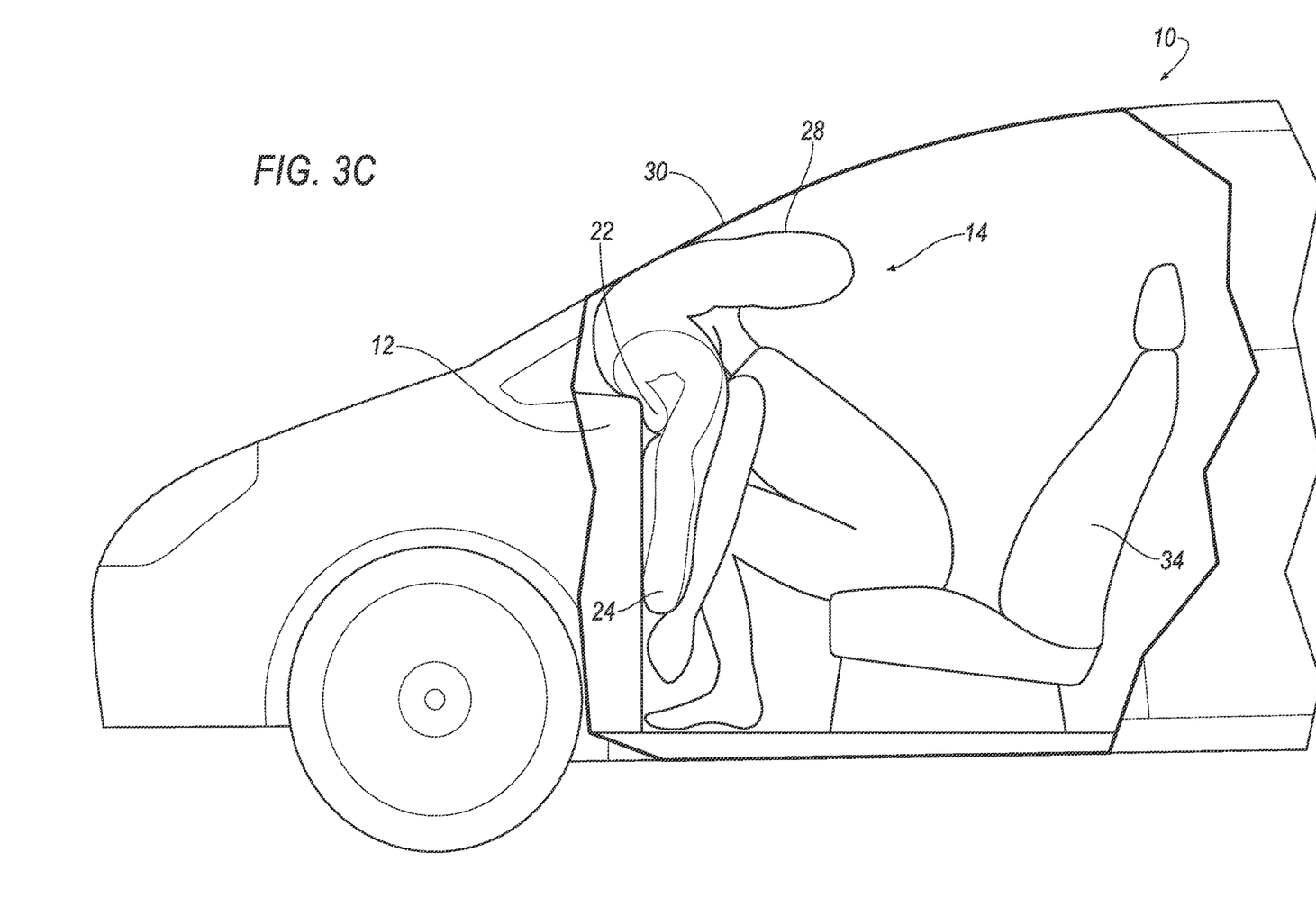
FIG. 3C is the side view at a later time than FIG. 3B.
Figure 3D:
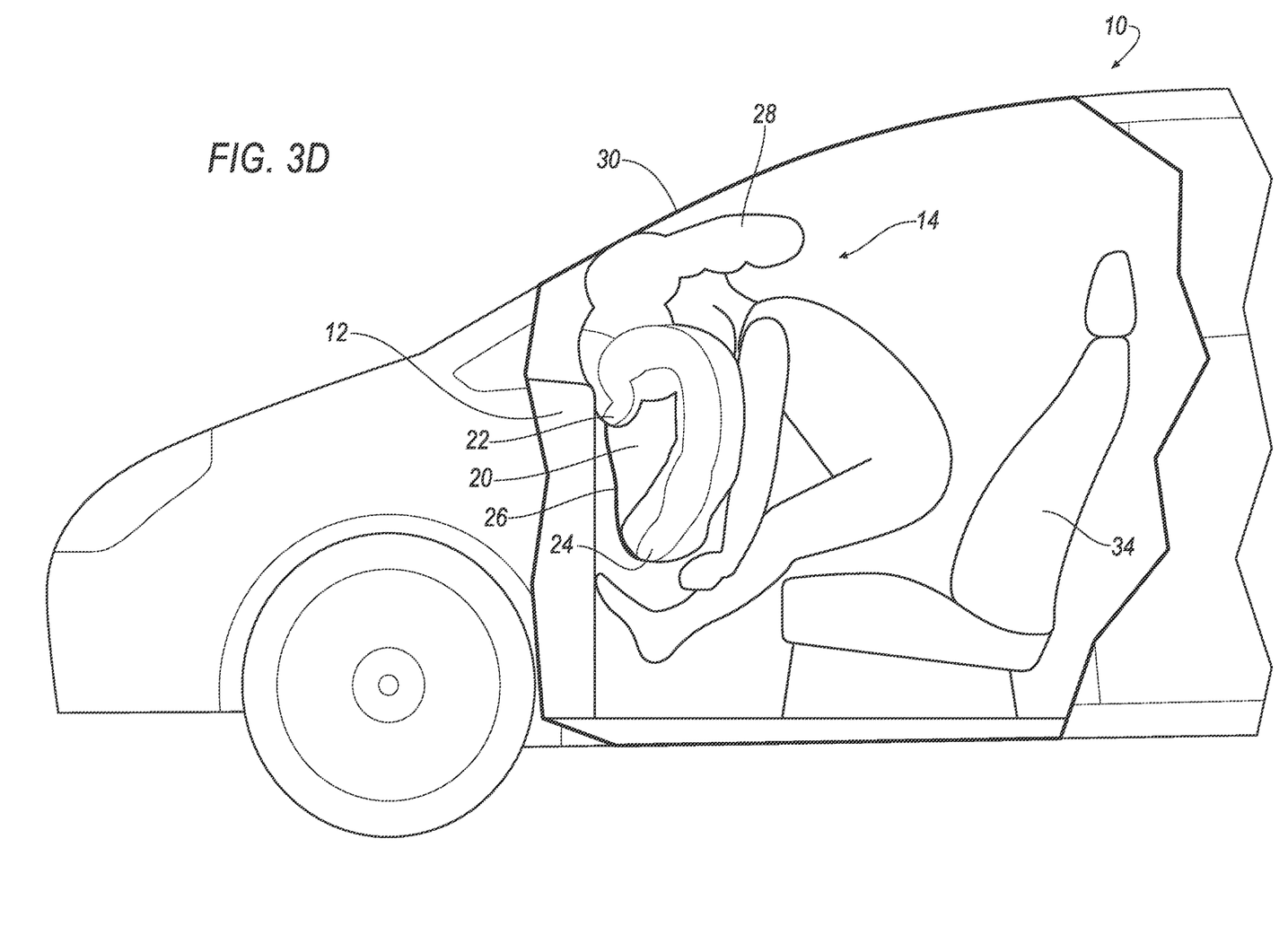
FIG. 3D is the side view at a later time than FIG. 3C.

With reference to FIGS. 2-3D, the front console 12 may be disposed in front of the front seats 34, e.g., at the front of the passenger cabin 32. The front console 12 may support a plurality of vehicle components. For example, when the vehicle 10 is the autonomous vehicle, the front console 12 may support upholstery, as set forth below, and/or entertainment features. In other examples, the front console 12 may include no instruments, i.e., may be a bulkhead, wall, etc.

The front console 12 may extend from one side of the vehicle 10 to the other side of the vehicle 10, i.e., across the passenger cabin 32 in the cross-vehicle direction. For example, the front console 12 may extend from one front pillar to the other front pillar. In other words, the front pillars and the windshield 30 may extend from the roof to the front console 12. The front console 12 may extend from the windshield 30 to the floor. The front console 12 may, for example, be fixed to the floor from one side of the vehicle 10 to the other side of the vehicle 10. The front console 12 may be fixed to the floor in any suitable manner, e.g., welding. The front console 12 may, for example, separate the passenger cabin 32 from an engine compartment of the vehicle 10.

The vehicle 10 may include a panel 36, i.e., upholstery, supported by the front console 12. The panel 36 may extend from one side of the vehicle 10 to the other side of the vehicle 10, e.g., across the front console 12. The panel 36 may present a class-A surface, i.e., a finished surface exposed to view by a customer and free of unaesthetic blemishes and defects. The airbag 14 may be disposed between the front console 12 and the panel 36 in the uninflated position. The panel 36 may have a tear seam for allowing the airbag 14 to break through the panel 36 when the airbag 14 is inflated from the uninflated position to the inflated position. The tear seam may be adjacent the airbag 14 in the uninflated position. The panel 36 may be any suitable type of material or materials, e.g., woven polymer.

Figure 6:
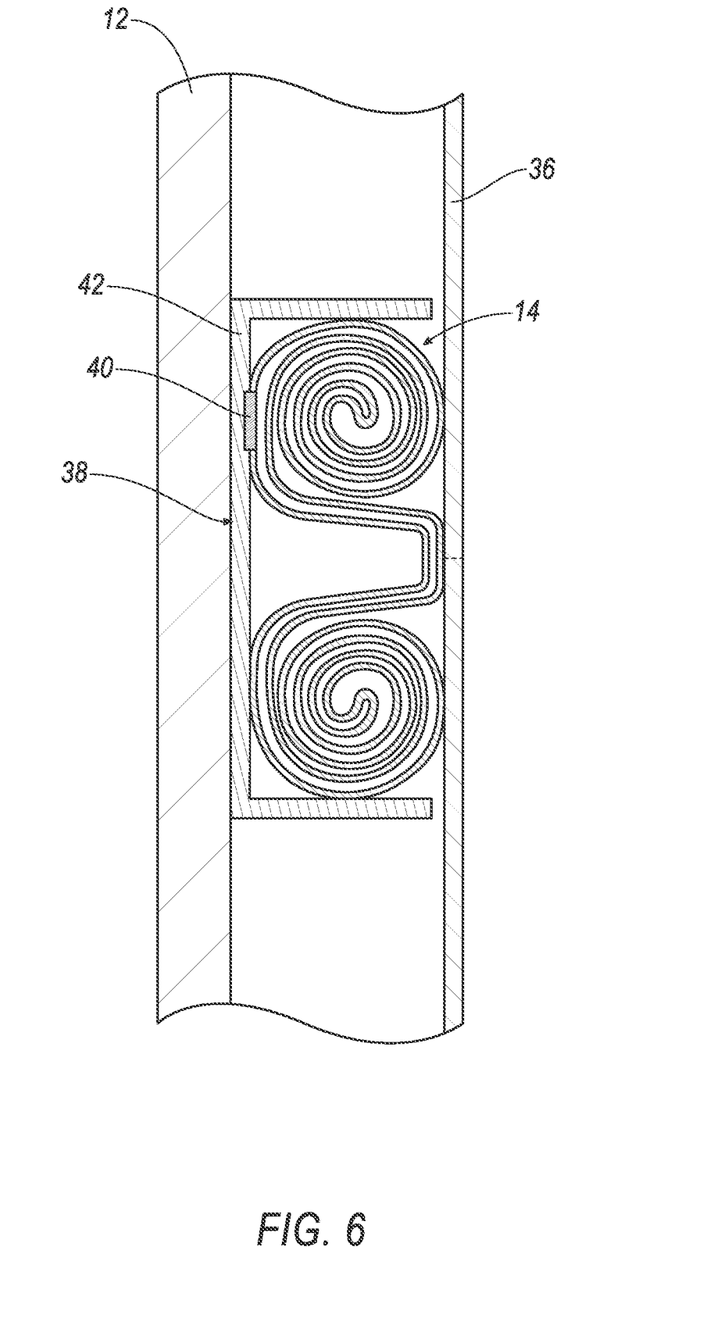
FIG. 6 is a cross-sectional view of FIG. 1.

The vehicle 10 includes an airbag assembly 38 including the airbag 14 and an inflator 40 and may including a housing 42. The airbag 14 is supported by the front console 12, e.g., via a housing 42. The housing 42 houses the airbag 14 in an uninflated position, shown in FIG. 6, and supports the airbag 14 in the inflated position, shown in FIG. 2. The airbag 14 may be rolled and/or folded to fit within the housing 42 in the uninflated position. The housing 42 may be of any suitable material, e.g., a rigid polymer, a metal, a composite, or a combination of rigid materials. The housing 42 may be supported by the front console 12.

The inflator 40 may be connected to the airbag 14, e.g., via tubing or other structure to transfer inflation medium from the inflator 40 to the airbag 14. Upon receiving an instruction, e.g., from a computer of the vehicle 10 in response to a vehicle impact, the inflator 40 inflates the airbag 14 with an inflatable medium, such as a gas, to the inflated position. The inflator 40 may be, for example, a pyrotechnic inflator that uses a chemical reaction to drive inflation medium to the airbag 14. The inflator 40 may be of any suitable type, for example, a cold-gas inflator. The inflator 40 may be supported by the housing 42 or at any other suitable vehicle 10 location. Inflation of the airbag 14 may tear, separate, or otherwise deform the front console 12.

The airbag 14 may be of any suitable type of material or materials. The airbag 14 may be of any suitable airbag 14 material, for example, a woven polymer. For example, the airbag 14 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 4:
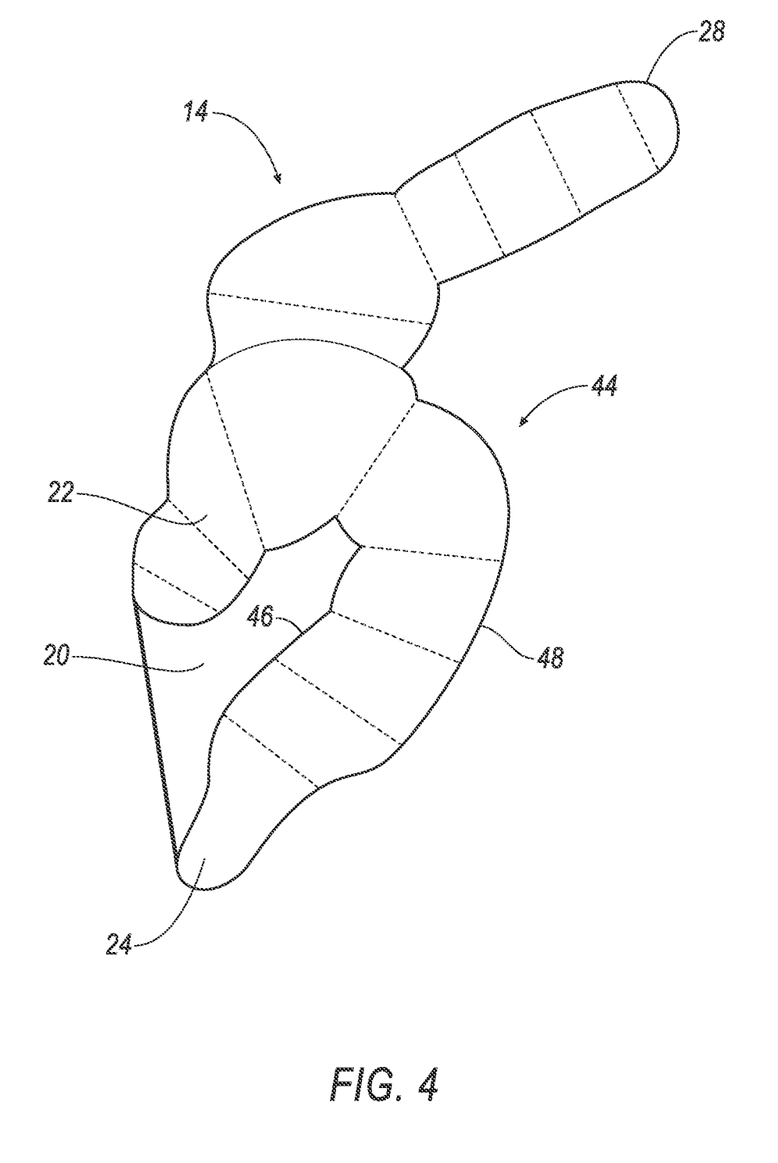
FIG. 4 is a side view of the airbag in the inflated position.
Figure 5:
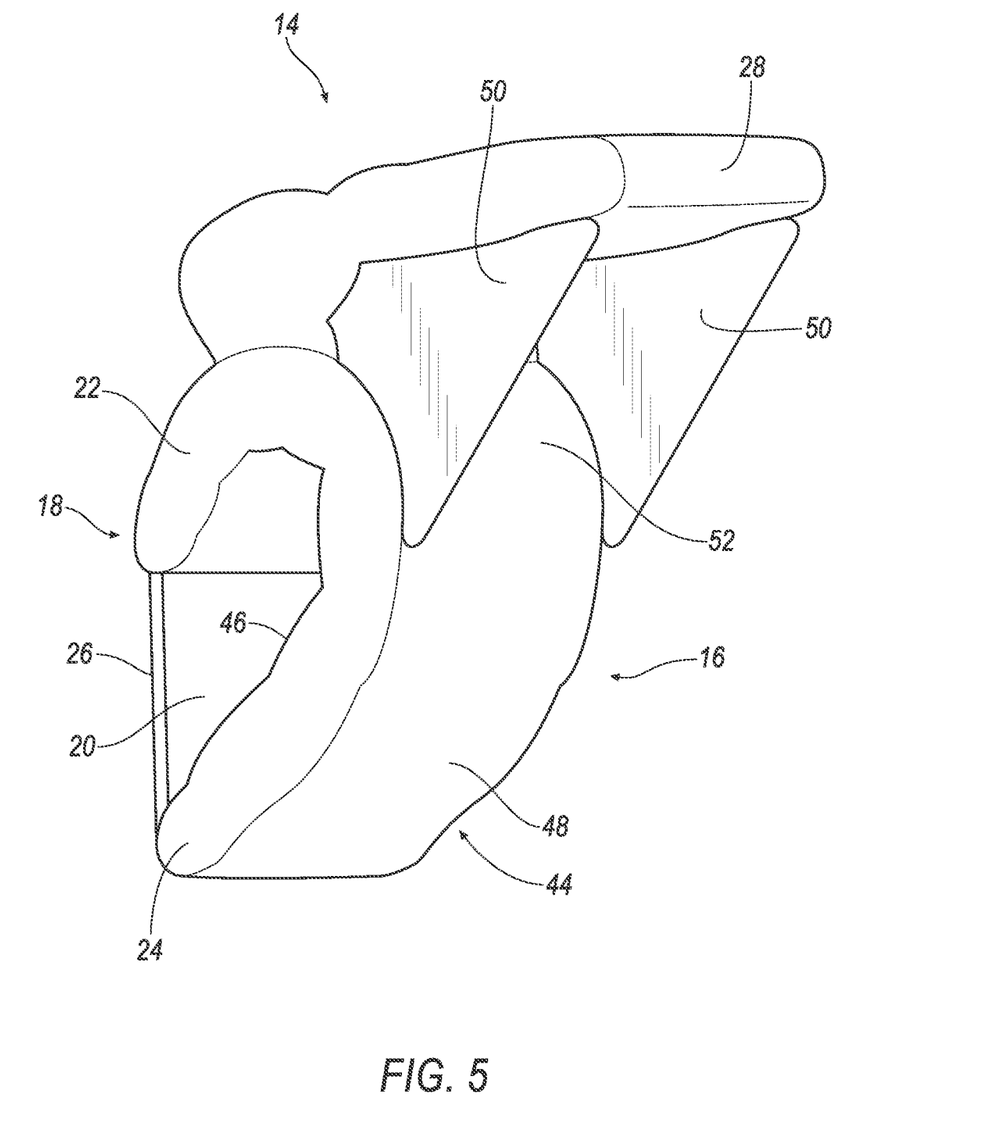
FIG. 5 is a perspective view of the airbag in the inflated position.

With reference to FIGS. 4 and 5, the airbag 14 includes a lower segment 44 and the extension 28 extends upwardly from the lower segment 44. The lower segment 44 is between the cavity 20 and the extension 28 and includes the upper lip 22 and the lower lip 24. The lower segment 44 and the extension 28 share a common inflation chamber.

In the inflated position, the upper lip 22 and the lower lip 24 of the lower segment 44 each abut the front console 12 and the cavity 20 extends between the upper lip 22 and the lower lip 24. The upper lip 22 and the lower lip 24 extend from the front console 12 along the cavity 20. The upper lip 22 and the lower lip 24 meet at a spine. The upper lip 22 and the lower lip 24 may extend from the inboard side 16 to the outboard side 16.

The lower segment 44 of the airbag 14 includes a forward panel 46 and a rearward panel 48 defining the inflation chamber therebetween. The forward panel 46 and the rearward panel 48 extend generally in parallel from the upper lip 22 to the lower lip 24. The forward panel 46 extends along the cavity 20. In other words, the forward panel 46 defines the cavity 20.

The airbag 14 is generally U-shaped around the cavity 20. Specifically, the lower segment 44 is generally U-shaped from the upper lip 22 to the lower lip 24. The cavity 20 extends upwardly between the upper lip 22 and the front console 12. Specifically, the cavity 20 may also extend vehicle-rearwardly. The upper lip 22 and the lower lip 24 may be elongated upwardly and vehicle-rearwardly away from the front console 12. The upper lip 22 and the lower lip 24 may be elongated in generally parallel directions.

The extension 28 extends upwardly from the rearward panel 48. Specifically, the extension 28 may also extend rearwardly from the rearward panel 48. The extension 28 is elongated away from the lower segment 44. In the inflated position, the extension 28 is positioned to abut the windshield 30. The extension 28 may extend from the inboard side 16 to the outboard side 18.

The external tether 26 extends from the upper lip 22 to the lower lip 24. The airbag 14 may include multiple tethers 26, e.g., at opposite cross-vehicle positions. For example, one tether 26 may be at the inboard side 16 and another tether 26 may be at the outboard side 18. The external tether 26 may be of the same material type as the lower segment 44 and the extension 28.

With reference to FIG. 5, the airbag 14 may include one or more uninflatable panels 50 extending from the extension 28 to the lower segment 44. For example, the airbag 14 may include two uninflatable panels 50 spaced from each other in a cross-vehicle direction to define a head-receiving pocket 52 therebetween. For example, one uninflatable panel 50 may be at the inboard side 16 and the other inflatable member may be at the outboard side 18. The head-receiving pocket 52 is designed to receive the head of the occupant. The head-receiving pocket 52 may retain the head of the occupant in contact with the airbag 14 during the vehicle-impact.

The vehicle 10 may include an impact sensor. The impact sensor is programmed to detect an impact to the vehicle 10. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle 10.

The vehicle 10 may include a communication network. The communication network includes hardware, such as a communication bus, for facilitating communication among vehicle 10 components. The communication network may facilitate wired or wireless communication among the vehicle 10 components in accordance with a number of communication protocols such as controller area network (CAN), Ethernet, WiFi, Local Interconnect Network (LIN), and/or other wired or wireless mechanisms.

The computer may be a microprocessor-based computing device implemented via circuits, chips, or other electronic components. For example, the computer may include a processor, memory, etc. The memory of the computer may store instructions executable by the processor as well as data and/or databases. The processor is programmed to initiate an inflation of the airbag 14 in response to the vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a front console;
   an airbag supported by the front console and inflatable to an inflated position, the airbag in the inflated position having an inboard side and an outboard side spaced from each other in a cross-vehicle direction;
   the airbag in the inflated position having a cavity open toward the front console and extending through the inboard side and the outboard side;
   the airbag in the inflated position having an upper lip and a lower lip each abutting the front console, the cavity extending between the upper lip and the lower lip.

2. The vehicle as set forth in claim 1, wherein the cavity extends upwardly away from the front console.

3. The vehicle as set forth in claim 2, wherein the upper lip is elongated upwardly along the front console.

4. The vehicle as set forth in claim 1, further comprising an external tether extending from the upper lip to the lower lip.

5. The vehicle as set forth in claim 1, wherein the airbag is generally U-shaped from the upper lip to the lower lip.

6. The vehicle as set forth in claim 1, wherein the airbag includes a lower segment and an extension extending upwardly from the lower segment, the lower segment being between the cavity and the extension and including the upper lip and the lower lip.

7. The vehicle as set forth in claim 1, wherein the airbag includes a forward panel and a rearward panel defining an inflation chamber therebetween and extending generally in parallel from the upper lip to the lower lip, the forward panel extending along the cavity.

8. The vehicle as set forth in claim 7, wherein the airbag includes an extension extending upwardly from the rearward panel.

9. The vehicle as set forth in claim 1, wherein the airbag is generally U-shaped around the cavity.

10. A vehicle comprising:
    a front console;
    an airbag supported by the front console and inflatable to an inflated position, the airbag in the inflated position having an inboard side and an outboard side spaced from each other in a cross-vehicle direction;
    the airbag in the inflated position having a cavity open toward the front console and extending through the inboard side and the outboard side; and
    the airbag in the inflated position including a lower segment and an extension extending upwardly from the lower segment, the lower segment being between the cavity and the extension.

11. The vehicle as set forth in claim 10, wherein the extension is elongated away from the lower segment.

12. The vehicle as set forth in claim 10, further comprising a windshield, wherein the extension abuts the windshield.

13. The vehicle as set forth in claim 10, wherein the lower segment is generally U-shaped.

14. The vehicle as set forth in claim 10, further comprising an uninflatable panel extending from the extension to the lower segment.

15. The vehicle as set forth in claim 14, further comprising another uninflatable panel extending from the extension to the lower segment, the uninflatable panels spaced from each other in a cross-vehicle direction.

16. The vehicle as set forth in claim 10, wherein the lower segment and the extension share a common inflation chamber.

* * * * *